United States Patent
Lee et al.

[11] Patent Number: 6,060,810
[45] Date of Patent: May 9, 2000

[54] STATOR FOR LINEAR MOTOR BY STAGGERED CORE LAMINATION

[75] Inventors: Hyeong Kook Lee, Kunpo; Eon Pyo Hong, Inchon, both of Rep. of Korea

[73] Assignee: LG Electronics Inc., Rep. of Korea

[21] Appl. No.: 09/346,147

[22] Filed: Jul. 9, 1999

[30] Foreign Application Priority Data

Jul. 13, 1998 [KR] Rep. of Korea ............... 98-28171

[51] Int. Cl.[7] ................................. H02K 1/12
[52] U.S. Cl. ............... 310/254; 310/258; 310/259; 310/216; 310/217; 310/208; 310/201; 310/194; 310/12; 310/14; 310/17
[58] Field of Search ................. 310/254, 258, 310/259, 216, 217, 208, 201, 194, 12, 14, 17, 42

[56] References Cited

U.S. PATENT DOCUMENTS

| | | | |
|---|---|---|---|
| 4,318,218 | 3/1982 | Nelson | 29/596 |
| 4,538,086 | 8/1985 | Marsh et al. | 310/258 |
| 4,563,606 | 1/1986 | Fukasawa et al. | 310/208 |
| 5,698,925 | 12/1997 | Coupart | 310/217 |
| 5,744,888 | 4/1998 | Zajc et al. | 310/185 |
| 5,778,512 | 7/1998 | Ichikawa et al. | 29/598 |

Primary Examiner—Thanh Lam
Attorney, Agent, or Firm—Ostrolenk, Faber, Gerb & Soffen, LLP

[57] ABSTRACT

The present invention relates to a stator for a linear motor by staggered core lamination which can facilitate insulation and assembly of a stator core, can freely set an interval of an opening of the stator core, and can reduce loss of the motor by decreasing a magnetic flux density of the core. The stator for the linear motor includes a stator coil formed by winding and insulating a coil at a cylindrical shape, a vertical unit consisting of a thin plate material, and having a predetermined width and length, a horizontal unit curved and extended in a right angle at one end portion of the vertical unit, and a plurality of core strips having pole parts gradually extended at an edge portion of the horizontal unit, and forming an inverted triangle shape, an inside edge portion of the vertical unit of the core strip being connected to an outer circumferential surface of the stator coil, an inside edge portion of the horizontal unit being connected to upper and lower surfaces of the stator coil, or alternately connected therewith having a predetermined interval, and laminated in a radial shape, edge portions of the pole parts of the core strips being connected to one another, and forming an inner circumferential surface, outside end portions of the vertical units forming an outer circumferential surface.

2 Claims, 3 Drawing Sheets

STATOR FOR LINEAR MOTOR BY STAGGERED CORE LAMINATION

BACKGROUND OF THE INVENTION

1. Field of the Invention

The present invention relates to a stator for a linear motor, and in particular to a stator for a linear motor by staggered core lamination which can facilitate insulation and assembly of a stator core, can freely set an interval of an opening of the stator core, and can reduce loss of the motor by decreasing a magnetic flux density of the core.

2. Description of the Background Art

In general, a conventional motor has a flux in a three-dimensional shape, while a linear motor has a flux in a plane shape. In the linear motor, a plane-shaped movable unit performs a linear motion on a plane according to a variation of the flux formed on a plane-shaped fixed unit.

An example of the linear motor will now be explained with reference to FIGS. 1 and 2.

FIGS. 1 and 2 are a front view and a side view illustrating a structure of the conventional linear motor, respectively.

As shown in FIGS. 1 and 2, the conventional linear motor includes: an outside stator core 10 formed by laminating a plurality of core strips 1 in a cylindrical shape, the plurality of core stripes respectively internally having an opening 1a in a predetermined size; a stator coil 20 wound in a ring-shaped groove formed at an inner circumferential surface of the outside stator core formed by the openings 1a of the laminated core strips 1; an inside stator core 30 formed by laminating a plurality of core strips having a predetermined shape in a cylindrical shape, and inserted into an empty space of the outside stator core 10, having a predetermined gap from its inner circumferential surface; and a magnet paddle 50 inserted into the gap between the inside and outside stator cores 30, 10, and having a plurality of magnets 40.

The outside stator core 10 where the inside stator core 30 and the stator coil 20 are wound composes a stator of the linear motor, and the magnet paddle 50 provided with the plurality of magnets 40 forms a movable unit of the linear motor.

In more detail, the core strip 1 forming the outside stator core 10 consists of a thin plate material, and has an U-shaped pass unit 1b, and a pole part 1c extended in an inverted triangle shape at both edge portions of the pass unit 1b.

As described above, the outside stator core 10 is formed by laminating the plurality of core strips 1 in a cylindrical shape. The end portions of the pole parts 1c of each laminated core strip 1 form the inner circumferential surface of the outside stator core 10, and the outside edge portions of the pass units 1b form the outer circumferential surface thereof.

Thereafter, the laminated outside stator core 10 is fabricated by forming the stator coil 20 by winding the coil at the ring-shaped groove formed by the openings 1a of the core strips 1, and by insulating the stator coil 20.

Here, the positions of the inside stator core 30 composing the linear motor and the outside stator core 10 where the stator coil 20 is wound can be exchanged.

The operation of the linear motor will now be explained.

When a current is applied to the stator coil 20, a magnetic flux formed by the current flows along the core strips 3 of the inside stator core 30 and the core strips 1 of the outside stator core 10. The magnet paddle 50 provided with the magnets 40 carries out a linear motion in an axis direction due to an interaction force formed by the magnetic flux and the magnets 40.

However, in the stator core composing the conventional linear motor as described above, the core strips are laminated in a cylindrical shape, and the stator coil is wound at the groove formed by the openings of the core strips. Accordingly, a process of winding the coil is complicated. After winding, it is difficult to insulate the wound coil.

In addition, the conventional core strip is formed having a predetermined opening for convenience of the winding process, and thus it is impossible to change an interval of the openings in accordance to constitution of an optimal magnetic circuit.

In general, as publicly known, the density of the magnetic flux influencing on efficiency of the motor is in proportion to an amount of the magnetic flux, and in inverse proportion to a cross section of the core which the magnetic flux passes through. In the case of the stator core formed by the core strips, the core strips forming the inner circumferential surface are adhered, and thus there is no gap therebetween. However, the core strips forming the outer circumferential surface have gaps (g) of a predetermined interval. As a result, the cross section of the core is reduced as much as the gap (g), and thus the density of the magnetic flux is increased, thereby increasing loss of the motor or influencing on a size thereof.

SUMMARY OF THE INVENTION

Accordingly, it is a primary object of the present invention to provide a stator core for a linear motor which can facilitate insulation and assembly of the stator core, and can reduce fabrication costs for optimizing a length of the magnets by freely setting an interval of openings of the stator core.

It is another object of the present invention to provide a stator core for a linear motor which can reduce loss of the motor by decreasing a density of a magnetic flux of the stator core.

In order to achieve the above-described objects of the present invention, there is provided a stator core for a linear motor, including: a stator coil formed by winding and insulating a coil at a cylindrical shape; a vertical unit consisting of a thin plate material, and having a predetermined width and length; a horizontal unit curved and extended in a right angle at one end portion of the vertical unit; and a plurality of core strips having pole parts gradually extended at an edge portion of the horizontal unit, and forming an inverted triangle shape, an inside edge portion of the vertical unit being connected to an outer circumferential surface of the stator coil, an inside edge portion of the horizontal unit being connected to upper and lower surfaces of the stator coil, or alternately connected therewith having a predetermined interval, and laminated in a radial shape, edge portions of the pole parts of the core strips being connected to one another, thereby forming an inner circumferential surface, outside edge portions of the vertical units forming an outer circumferential surface.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A stator for a linear motor by staggered core lamination in accordance with the present invention will now be described in detail with reference to the accompanying drawings.

Figure 1:
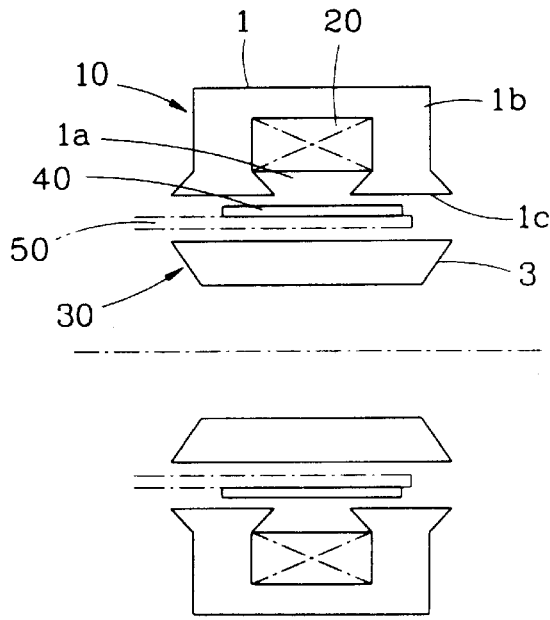
FIG. 1 is a front view illustrating a structure of a stator for a conventional linear motor.
Figure 2:
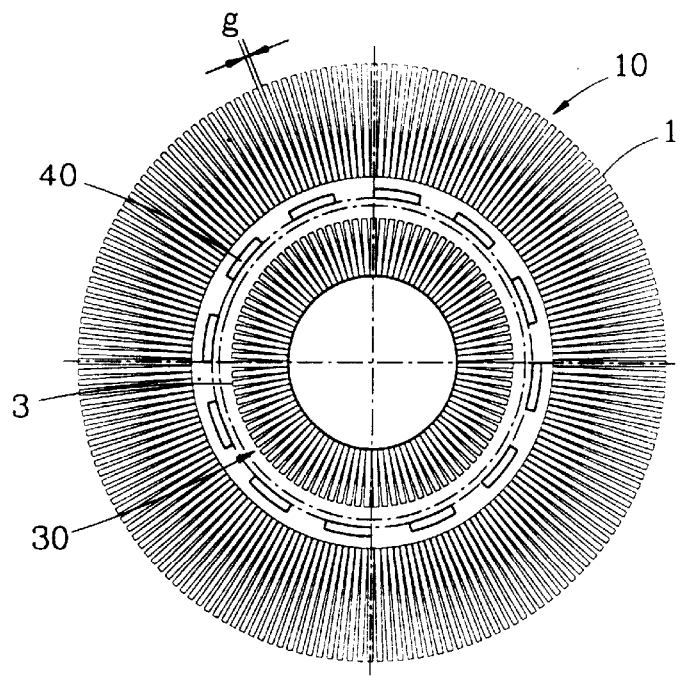
FIG. 2 is a side view illustrating a structure of a stator for the conventional linear motor.
Figure 3:
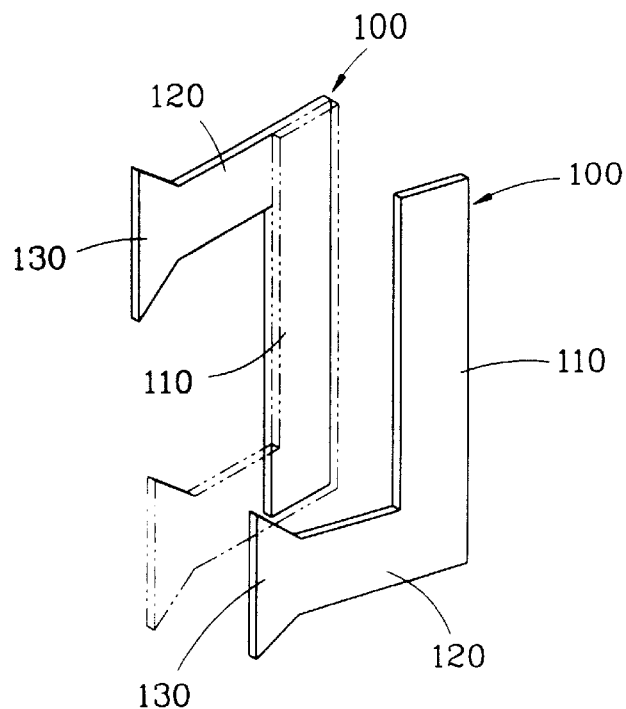
FIG. 3 is a perspective view illustrating a core strip of a stator for a linear motor in accordance with the present invention.

FIG. 3 is a perspective view illustrating a core strip of a stator core for the linear motor in accordance with the present invention.

Referring to FIG. 3, the core strip 100 for forming the stator core for the linear motor in accordance with the present invention includes: a vertical unit 110 consisting of a thin plate material, and having a predetermined width and length; a horizontal unit 120 curved and extended in a right angle at one end portion of the vertical unit 110; and a pole part 130 gradually extended at an edge portion of the horizontal unit 120, and forming an inverted triangle shape.

The stator core for the linear motor formed by the core strips 100 will now be explained with reference to FIGS. 4 and 5.

Figure 4:
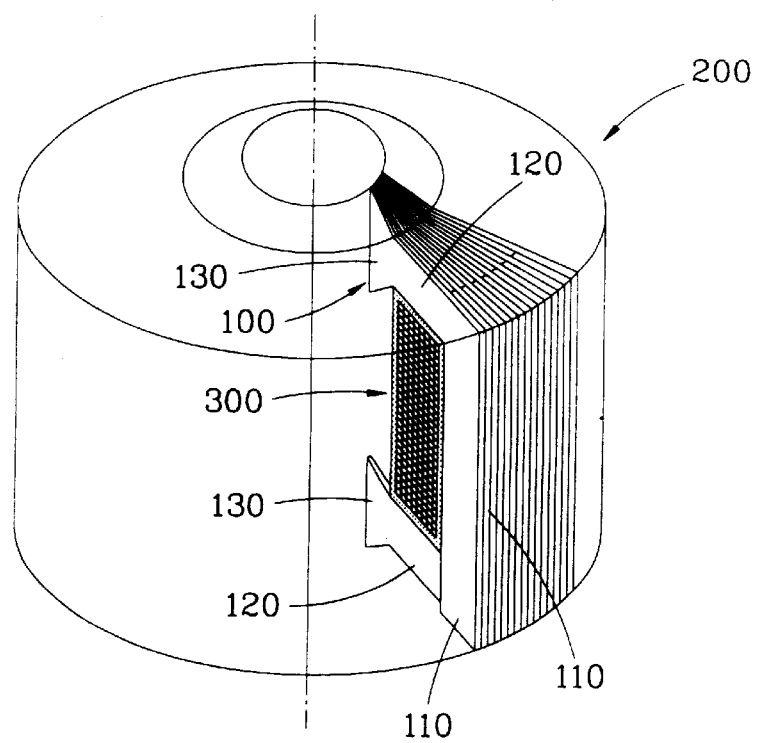
FIG. 4 is a perspective view illustrating an outside stator core for the linear motor by staggered lamination in accordance with the present invention.
Figure 5:
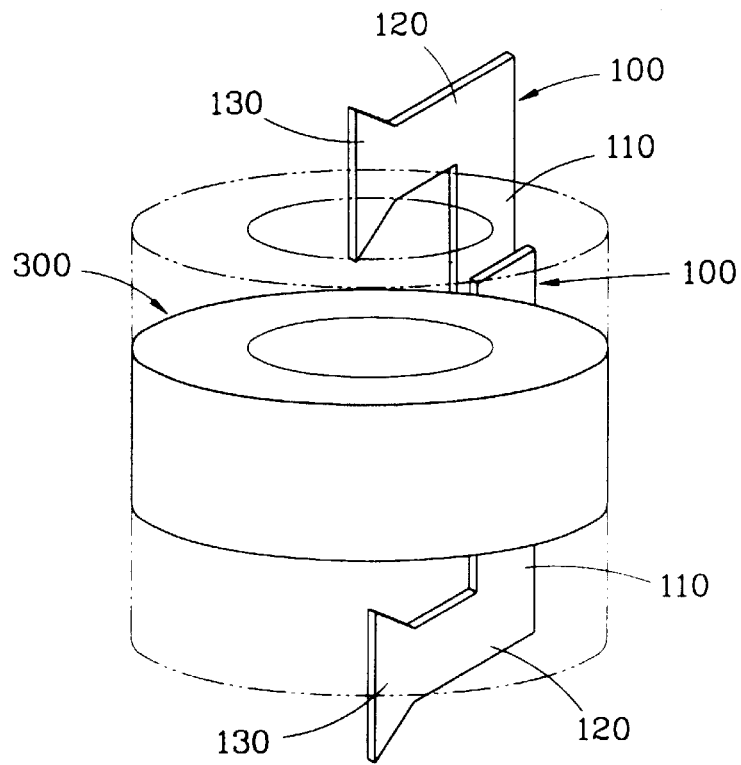
FIG. 5 is a perspective view illustrating a process of laminating the outside stator core for the linear motor on a stator coil in accordance with the present invention.

FIG. 4 is a perspective view illustrating an outside stator core for the linear motor by staggered core lamination in accordance with the present invention, and FIG. 5 is a perspective view illustrating a process of laminating the outside stator core for the linear motor on a stator coil in accordance with the present invention.

First of all, the outside stator core is exemplified as an embodiment of the stator core according to the present invention.

In the outside stator core 200 according to the present invention, an inside edge portion of the vertical unit 110 of the core strip 100 is connected to an outer circumferential surface of the stator coil 300 which is wound in a cylindrical shape and insulated, an inside edge portion of the horizontal unit 120 is connected to upper and lower portions of the stator coil 300, or alternately connected therewith having a predetermined interval, and thus laminated in a radial shape. The edge portions of the pole parts 130 of the core strip 100 are connected to one another, thus forming an inner circumferential surface, and the outside edge portions of the vertical units 110 form an outer circumferential surface.

That is, the horizontal unit 120 of the core strip 100 is alternately laminated in a radial shape on the upper and lower surfaces of the stator coil 300, thus forming a cylindrical shape. Accordingly, the edge portions of the pole parts 130 of the core strip 100 are connected to one another, thereby forming the inner circumferential surface, and the outside edge portions of the vertical unit 100 form the outer circumferential surface.

Figure 6:
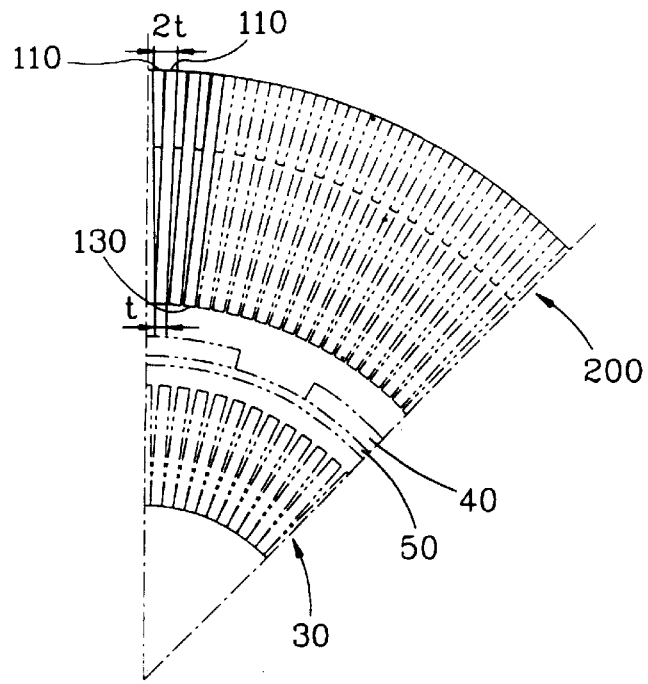
FIG. 6 is an enlarged side view illustrating a part of the stator core for the linear motor in accordance with the present invention.

FIG. 6 is an enlarged side view illustrating a part of the linear motor in accordance with the present invention.

Identical units to the conventional units are provided with identical reference numerals.

As shown therein, in the outside stator core 200, an inside arc and an outside arc are formed by a pair of core strips 100 which are alternated. A thickness of the inside arc is "t" and that of the outside arc is "2t".

As a result, according to the entire configuration of the outside stator core 200 laminating the core strips 100 in a radial shape to form a cylindrical shape, intervals of the outside vertical units 100 are minimized.

A cylindrical-shaped inside stator core 30 is inserted into an empty space of the outside stator core 200, having a predetermined gap. A movable unit 50 having magnets 40 is inserted into the gap between the inside stator core 30 and the outside stator core 200, thus composing the linear motor.

Here, in the case that the core strip 100 is laminated on the stator coil 300 wound in a cylindrical shape and insulated, the stator core in accordance with the present invention can control an interval between the pole parts 130 of the core strip 100 in a vertical direction. Therefore, set is a length of the magnet 40 determined according to a displacement of the magnet paddle 50, namely the movable unit and the interval between the pole parts 130, thereby composing an optimal magnetic circuit.

In addition, in the outside stator core 200, an amount of the core strip 100 is increased, and thus a cross section of the core is increased. As a result, a density of the magnetic flux is decreased, thereby reducing loss of the motor.

Furthermore, the stator coil 300 is formed by winding the coil in a cylindrical shape, an insulation film is formed on its outer surface, and the core strips 100 are laminated thereon. Thus, a winding process of the stator coil 300 is simplified, and thus insulation of the wound stator coil 300 is facilitated.

The operation of the linear motor including the outside stator core 200 in accordance with the present invention will now be explained.

When a current is applied to the stator coil 300, the magnetic flux formed by the current flows along the core strips 3, 100 of the inside and outside stator cores 30, 200. The magnet paddle 50 provided with the magnets 40 performs a linear motion in an axis direction due to an interaction force formed by the magnetic flux and the magnets 40.

Here, the core strips 100 composing the outside stator core 200 are laminated in a radial shape, and thus formed in a cylindrical shape. Accordingly, the inner circumferential portion of the outside stator core 200 forms a single surface by the pole parts 130 of the core strips 100.

The linear motor including the stator core in accordance with the present invention is applied to a linear compressor. The linear compressor compresses gas by converting straight kinetic energy generated by the linear motor into straight kinetic energy of a piston.

As discussed earlier, as the stator core for the linear motor in accordance with the present invention is fabricated by laminating the core strips on the stator coil provided with the insulation film, the winding process and the insulation process of the stator coil are simplified, thereby improving assembly productivity.

In addition, when the motor is fabricated, the density of the magnetic flux of the stator core is reduced, and thus loss of the motor is also decreased. As the motor is reduced in size, the products can be minimized in size. In addition, fabrication costs are lowered by decreasing an amount of the magnets which are high priced.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A stator core for a linear motor comprising:
   a stator coil formed by winding and insulating a coil at a cylindrical shape;
   a vertical unit consisting of a thin plate material, and having a predetermined width and length;
   a horizontal unit curved and extended in a right angle at one end portion of the vertical unit; and
   a plurality of core strips having pole parts gradually extended at an edge portion of the horizontal unit, and forming an inverted triangle shape, an inside edge portion of the vertical unit of the core strip being connected to an outer circumferential surface of the stator coil, an inside edge portion of the horizontal unit being connected to upper and lower surfaces of the stator coil, or alternately connected therewith having a predetermined interval, and laminated in a radial shape, edge portions of the pole parts of the core strips being connected to one another, thereby forming an inner circumferential surface, outside edge portions of the vertical units forming an outer circumferential surface.

2. The stator core for the linear motor according to claim 1, wherein the inside edge portion of the core strip is laminated having a predetermined interval from the upper and lower surfaces of the stator coil, when the core strip is laminated on the stator coil.

* * * * *